April 23, 1940.  R. DAUB  2,197,758

TRANSMISSION MECHANISM

Filed Oct. 7, 1937  5 Sheets-Sheet 1

INVENTOR
*Rudolph Daub*
BY
ATTORNEY

April 23, 1940.          R. DAUB                2,197,758
TRANSMISSION MECHANISM
Filed Oct. 7, 1937            5 Sheets-Sheet 2

INVENTOR
Rudolph Daub
BY
ATTORNEY

April 23, 1940.   R. DAUB   2,197,758
TRANSMISSION MECHANISM
Filed Oct. 7, 1937   5 Sheets-Sheet 3

Fig. 4.

INVENTOR
Rudolph Daub
BY

ATTORNEY

April 23, 1940.        R. DAUB        2,197,758
TRANSMISSION MECHANISM
Filed Oct. 7, 1937        5 Sheets-Sheet 4

INVENTOR
Rudolp Daub
BY
ATTORNEY

Patented Apr. 23, 1940

2,197,758

UNITED STATES PATENT OFFICE 2,197,758

TRANSMISSION MECHANISM

Rudolph Daub, Paterson, N. J.

Application October 7, 1937, Serial No. 167,685

12 Claims. (Cl. 74—327)

This invention relates to gear transmission mechanisms, and particularly to devices of this class employed for the purpose of effecting gear ratio changes between the power output shaft of an engine and the wheels of a vehicle adapted for forward and reverse movement.

It is common knowledge that practically all gear transmissions in this category employ a plurality of adjacent shafts, this being true both of the "lay shaft" and the "planetary" type of gear change mechanisms, the most widely adapted system being the lay shaft type employing three shafts. Of these, the main or power output shaft is coaxial with the engine crankshaft, and contains at one of its ends means to receive the drive from the engine, and at the opposite end or the extension thereof a bevel gear meshing with a gear on the axle of the vehicle. In a three speed transmission, there are two lay shafts in parallel relation to the main shaft, one carrying the first and second speed gears and the other carrying the reverse gear. In the third speed, where a direct drive is effected, the gears on the lay shafts are generally stationary or idling, so that only a single pair of gears, carried by the transmission output shaft or extension thereof and the axle, have imposed upon them the burden of transmitting the load.

An obvious disadvantage of the above-described type of transmission is that the high load transmitted particularly in first and second speeds must be borne by a bevelled type of gear, which is not best suited for this purpose. Particularly in road vehicles, this disadvantage becomes a rather serious shortcoming, due to the fact that the bevel gear on the axle must be kept small in order to maintain sufficient road clearance. And since, for reasons of economy, the entire reduction in speed between the usual engine crank shaft and axle (generally 4 to 1) is effectuated in this one pair of bevel gears, the size of the bevel pinion necessarily becomes quite small. This is one of the reasons why heavy duty vehicles are generally equipped with double reduction axle designs. It is one of the objects of this invention to overcome these shortcomings by avoiding the employment of bevel gears in places where the loads transmitted are heavy. This is accomplished by employing spur or helical type of spur gears in the power line where the loads are heaviest, and by effecting part of the direct drive reduction by means of gears between the engine and transmission. By this arrangement, the size of the gear in the axle could be decreased, thereby increasing road clearance, or, a double or further reduction can be effectuated. Although my transmission does employ bevel gears, these are remote from the axle; and furthermore, the load transmitted by such bevel gears is only proportional to the power imposed by them or by the engine, and is not increased during first and second speed gear ratios as is the case in the conventional structures where the bevel gears connect the transmission output shaft and the rear axle.

In the conventional type of transmission for vehicles, the main shaft thereof is, as above stated, coaxial with the engine crank shaft, resulting in a design of very great length. This construction has the disadvantage not only of being subject to the danger of serious torsional vibration, but also rendering it difficult to apply such an arrangement to vehicles having the engine in the rear. Even where the transmission main shaft is placed parallel with and closely adjacent the engine crank shaft, the resulting design is nevertheless of considerable bulk and consumes much of otherwise useful wheel base space of a vehicle. It is another object of my invention to make possible the elimination of the coaxial relation between the transmission main shaft and the crankshaft of the engine, and present an efficient construction of compact design and economical of space.

Engineers are universally cognizant of the fact that when the conventional type of transmission is to be employed in conjunction with the radial type of engine, many difficulties present themselves. If the crankshaft of an engine of this type, when unsupercharged, is either horizontally disposed or inclined, numerous problems in connection with carburetion, manifolding, cooling and lubrication appear. For example, the water outlets from all cylinder jackets would have to be at the higher points, in order to prevent the formation of steam pockets; and in an engine with a horizontal or nearly horizontal axis this would be at the head end in one or two cylinders and at the opposite end in the others. Problems relating to inlet manifolding would have to be solved on an entirely new basis, quite likely necessitating the employment of a blower, so as to assure uniform distribution. Furthermore, certain structural difficulties would also appear. If the crankshaft axis were horizontal and in line with the axis of the differential that would bring the lowermost cylinders too close to the ground,— a difficulty which might be overcome by tilting the crankshaft and by the undesirable expedient of using an over-mounted worm final drive. If the crankshaft axis were to be mounted at an inclination such as 45° to the vertical, this would in effect necessitate a cantilever support, where the weight and the inertia forces occurring particularly during severe road shocks would act on the mounting connections. It is hence an accepted fact that radial engines with a vertically disposed crankshaft would be best suited for the purpose, thereby assuring that all the cylinders would receive uniform mixtures and the aforesaid structural difficulties would be eliminated, particularly in view of the fact that in such a vertical arrangement, it would be possible to place the engine directly over the axle with the least amount of overhang.

It is within the contemplation of my invention to permit a radial power plant to be so mounted on a vehicle as to have its crankshaft vertically disposed in accordance with good engineering design, whereby the foregoing difficulties will be eliminated. Hence with the construction constituting this invention, a radial engine may be employed with horizontally disposed cylinders, whereby the peculiar combination of carburetor, gas passages and intake ports, together with the inherent advantages of the superior firing order of a radial engine the cylinders of which breath and fire in the direction of rotation of the crankshaft will assure the utmost evenness and uniformity in gas distribution. Such an arrangement, made possible with my invention, is obviously superior to in-line engines where the carburetor is located midways of a long manifold subject to the suction of cylinders placed on the opposite ends thereof, frequently resulting in backsurges in the manifold.

It is also an object of this invention to enable the power plant to be placed directly over the axle, or slightly ahead or in the rear thereof, thereby presenting a construction with the least amount of overhang. In this manner, the center of gravity of the engine can be relatively low, well within the confines of the wheels.

Another object of my invention is to provide a transmission wherein the main shaft, the lay shaft and the driven axle are arranged in a substantially horizontal plane, thereby resulting in a flat design and consequently providing ample road clearance in a vehicle where the engine is mounted on a relatively low level. Such an arrangement obviously results in a low center of gravity of the assembly thereby fulfilling a requirement of vital importance for road vehicles. And it is still a further object to effect, by employing the transmission constituting this invention, a low center of gravity construction not only for a radial type of engine but also for an inline or V type engine.

Another object of this invention is to employ in a vehicle transmission adapted for forward and reverse movements only two shafts, one main and one lay shaft.

Still another object of this invention is to enable the power plant, transmission and differential to be placed in a single housing with a common oil bath.

It is within the further contemplation of this invention to enable a transmission mechanism for road vehicles to receive the power of two synchronized or independent power plants.

And it is still a further object of this invention to enable a vehicle equipped therewith to be suitable for "midship" mounting of the engine, dial reduction, a four wheel drive and an equal number of forward and reverse speeds such as are used in combat cars.

Other objects, features and advantages will appear from the drawings and the description hereinafter given.

Referring to the drawings.

Figure 1:
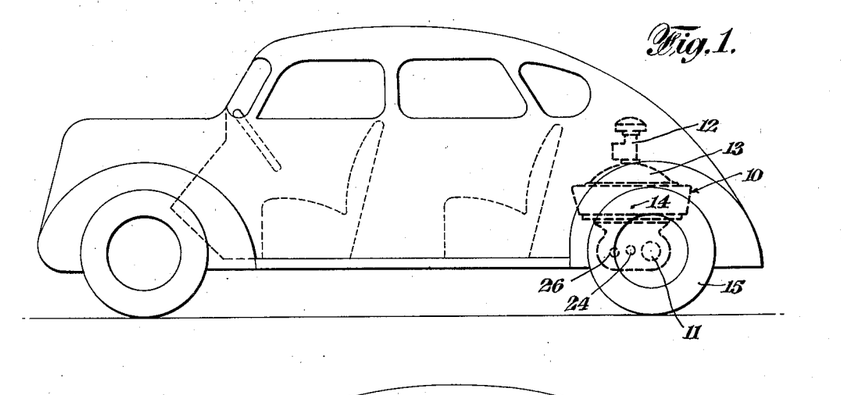
Figure 1 is a side view of an automobile showing, in dotted lines, a radial engine mounted over the rear axle, with the transmission constituting my invention below the engine.

In Figure 1 of the drawings the radial engine 10 is shown mounted over the rear axle 11, the carburetor 12 being mounted on the manifold housing 13. Although not shown on the drawings, it is obvious that the radial engine so mounted contains gas passages of equal length and identical shape connecting the intake ports with the carburetor throat. It is also within the contemplation of this invention to have the parts so mechanically designed that the center of gravity 14 will be within the confines of wheel 15.

Figure 2:
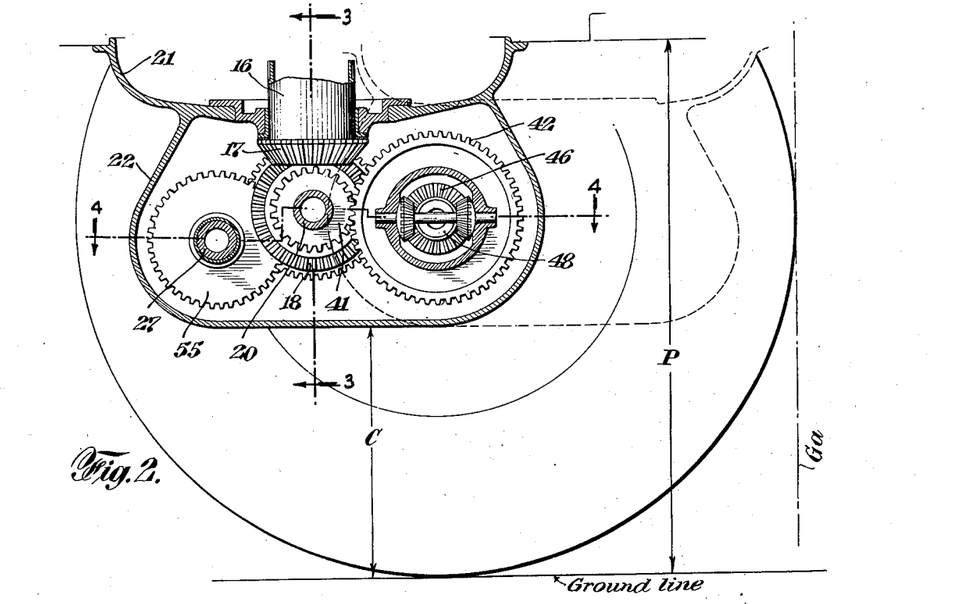
Figure 2 is a fragmentary longitudinal section along line 2—2 of Figure 4, illustrating the transmission constituting my invention and part of the engine platform of a vehicle, the platform being shown by dotted lines in another possible position within the contemplation of this invention.
Figure 3:
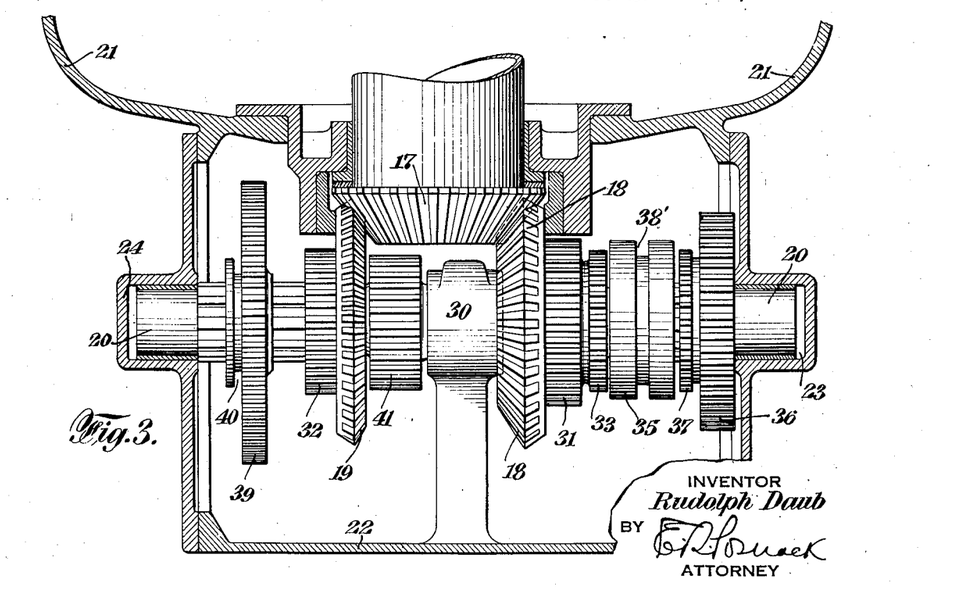
Figure 3 is a fragmentary vertical section of Figure 2 taken along line 3—3.

The crankshaft extension or power input shaft 16 of the said radial engine 10 is vertically disposed, as shown in Figures 2 and 3, the lower terminal of said crankshaft extension containing a bevel gear 17 in operative engagement at diametrically opposite sides thereof with the bevel gears 18 and 19 on the power output or main shaft 20 of the transmission mechanism constituting my invention. It should be noted that the crankshaft bevel gear 17 is represented by dot dash lines on Figure 4 so as to show its relative position with respect to the other elements constituting my invention. The said bevel gear 18 will hereafter be referred to as the bevel forward gear and the gear 19 as the bevel reverse gear. The engine platform 21 is preferably an integral part of the housing 22 of the transmission mechanism and the rear axle differential, as clearly shown in Figures 2, 3 and 4. Said housing contains, in the specific form of my device disclosed in the drawings, recessed portions 23, 24, 25 and 26 forming bearings for the power output shaft 20 and the lay shaft 27. The bracket 28 also contains bearings 29 and 30 for supporting the shafts 27 and 20 respectively.

Figure 4:
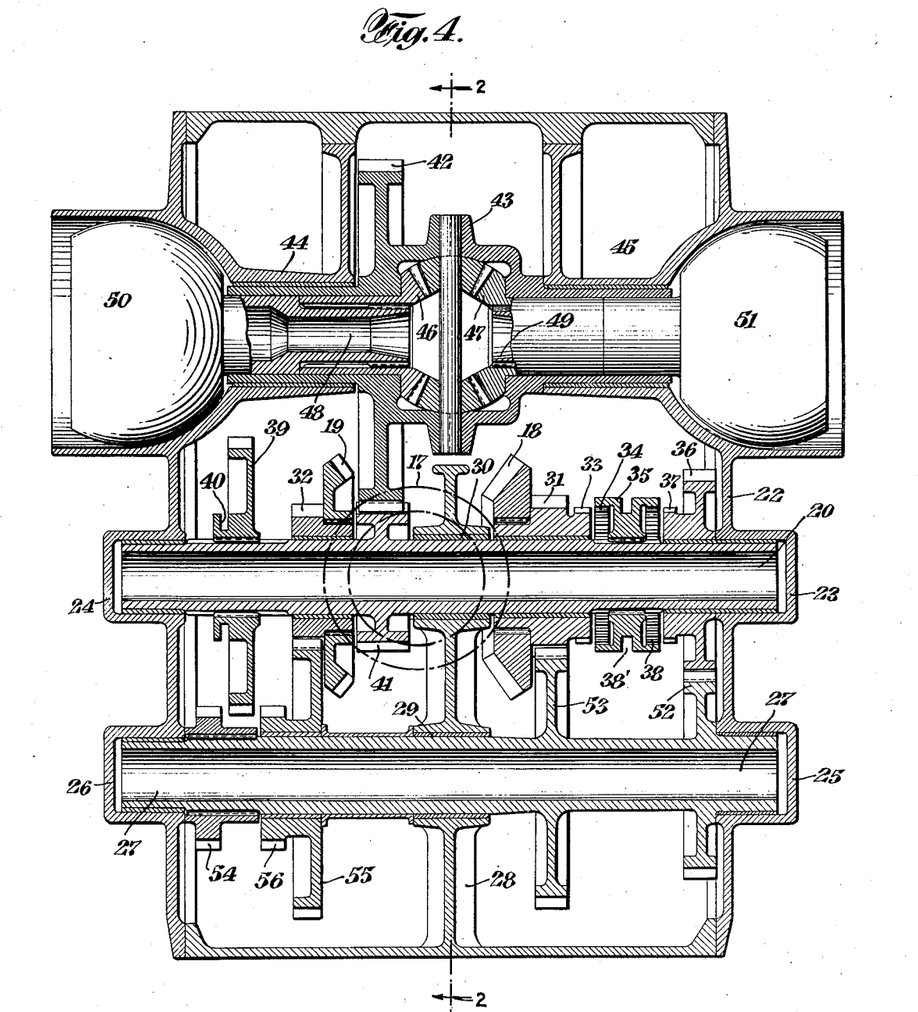
Figure 4 is a sectional plan of Figure 2 taken along line 4—4.

On the power output shaft 20 are positioned a number of gears for intermeshing with cooperating gears on the lay shaft 27 and on the differential as will be more specifically hereinafter described. Loosely mounted on said shaft 20 are the spur gears 31 and 32, the former having rigidly keyed thereto the bevel forward gear 18, and the latter the bevel reverse gear 19. Preferably forming an integral portion of gear 31 is the splined extension 33, adapted for engagement with the toothed recessed portion 34 of the coupling 35 slidably mounted on shaft 20. Loosely mounted on said shaft 20 is the second speed gear 36 which also contains thereon a splined extension 37 adapted for engagement with the toothed recessed portion 38 of said coupling 35. Said coupling is movable either to the right or left, so as to bring it into operative engagement with either the splined extensions 33 or 37, the means for operatively moving the coupling being of a conventional nature, such as a gear shift lever in suitable operative engagement with the notched portion 38' of the coupling. Also slidably mounted on the shaft 20 is the gear 39, which by any conventional type of gear shifting mechanism can be moved either to the right or left, the notched portion 40 serving to receive the shifting rod mechanism.

Rigidly mounted on shaft 20 is the spur gear type pinion or driving gear 41 in constant engagement with the relatively large gear 42 forming part of the differential housing 43 rotatably mounted within the bearings 44 and 45. The differential bevel gears 46 and 47 are splined to shafts 48 and 49 respectively, these having on their outer ends and suitably secured thereto the universal joints 50 and 51 respectively.

The lay shaft 27 in parallel relation to power output shaft 20 contains rigidly connected thereto the second speed gear 52, the gear 53 in engagement with the spur gear 31, and the first speed gear 54; and loosely mounted on said lay shaft is the reverse gear 55 in constant engagement with the spur gear 32.

In the arrangement of parts as shown in Figure 4 the transmission is in neutral position, and the power output shaft 20 is stationary. In order to bring the action into first speed, the gear 39 is shifted to the left so that it is brought into engagement with the first gear 54 on lay shaft 27. The power is transmitted through certain of the aforesaid gears in the following order: from bevel gear 17 on the power input shaft to the bevel forward gear 18 to spur gear 31 to gear 53 on lay shaft 27. Inasmuch as said latter gear is rigidly connected to the lay shaft, the shaft will be caused to rotate carrying with it the first gear 54; and inasmuch as this latter gear is in engagement with gear 39 on shaft 20, the latter shaft will also be caused to rotate, resulting in a rotation of spur gear 41, the gear 42 in the differential housing and consequently the shafts 48 and 49 to effect an operation of the vehicle. During all this time, it will be noted that the reverse bevel gear 19 is loosely rotating on shaft 20 in the opposite direction to forward gear 18,—said rotation merely causing an idle rotation of gears 32 and 55.

To effect a second speed drive, coupling 35 is shifted towards the right so that the internally splined recess 38 meshes with the splined extension 37 on gear 36. The power is then transmitted from bevel gear 17 to gears 18 and 31, and then to gear 53 on lay shaft 27. Inasmuch as the latter gear is rigidly mounted on the lay shaft, said shaft will rotate and cause gear 52 to rotate with it, thereby actuating gear 36 and the coupling 35 which is now in engagement with the splined extension 37. And inasmuch as said coupling is rigidly secured to shaft 20, the latter will rotate and cause a forward rotation of spur gear 41, gear 42 and shafts 48 and 49.

To effect the third speed drive, the coupling 35 is shifted to the left until the splines in the recess 34 thereof mesh with those on extension 33. The power is then transmitted from bevel gear 17 to the forward bevel gear 18, the spur gear 31, spline extension 33 and finally to coupling 35. Inasmuch as the coupling is, as aforesaid, affixed to shaft 20, it will cause the latter shaft to rotate, bringing into action the spur gear 41, large gear 42 and shafts 48 and 49.

To effect the reverse drive, the gear 39 is shifted to the right until it meshes with the reverse idler 56 rigidly attached to gear 55. The power is then transmitted from bevel gear 17 to reverse bevel gear 19, spur gear 32, gear 55 on lay shaft 27, gear 56, and then back to gear 39; and inasmuch as said latter gear is keyed to shaft 20, the latter will rotate to carry with it the spur gear 41, gear 42 and shafts 48 and 49. As previously noted, the bevel gear 19 rotates in the direction opposite to that of gear 18 inasmuch as gears 18 and 19 are positioned on diametrically opposite portions of bevel gear 17. Hence the shaft 20 will obviously rotate, with the last mentioned arrangement, in a reverse direction, and the shafts 48 and 49, and consequently the wheels of the vehicle attached thereto will also rotate in reverse direction. It should also be noted that during the reverse action above described, the forward bevel gear 18 does not in any way affect the spur gear 41, inasmuch as the rotation of said gear 18 will only cause an idle rotation of shaft 27.

It is thus apparent that with the construction shown and above described, three forward and one reverse speeds can be effectuated, and yet only two shafts are employed in the transmission, one power output shaft and one lay shaft. The vertical disposition of the crankshaft 16 enables a radial engine to be employed with horizontally disposed cylinders, thereby presenting a construction having all the advantages hereinbefore set forth for radial engines.

It is important to note that the bevel gears 17, 18 and 19 do not have any increase in loads imposed upon them during the first and second speeds, inasmuch as the load transmitted by these bevel gears is proportional to the power imposed upon them by the engine. This is in contrast to the conventional type of transmission, having the bevel gears connecting the transmission output shaft and the rear axle. It should furthermore be noted that the driving bevel gear 17 on the crankshaft can be made considerably larger than the bevel pinions commonly used on axle drives in conventional constructions, so that the tooth load and therefore the wear will be considerably less in the present construction than in the said conventional drive. In this arrangement, the gears 41 and 42, connecting the transmission to the axle, are of the spur gear type, thereby presenting a construction with the undesirable bevel gears at this region entirely eliminated. Such an arrangement obviously improves the life of the mechanism and insures noiseless running.

Referring to Figure 2, it will be noted that the axis of the power output shaft 20, the lay shaft 27 and the axle shafts 48 and 49 are substantially on a horizontal level, thereby providing a large road clearance C above the ground, as well as a low level P of the engine platform 21. This naturally results in a low center of gravity of the entire assembly, which is a vital requirement in road vehicles. This condition will also prevail in case of an "in-line" or V engine suitably mounted on platform 21, in which event the line Ga would represent the ground line (see Figure 2). With this arrangement, it is apparent that the center of gravity will also be relatively low, and can be brought within the confines of the wheel.

By referring to Figure 3 it will be seen that the bevel gears 18 and 19 are larger than the input bevel gear 17, thereby effecting a speed reduction between the engine and the transmission in all speeds including third. This, of course, permits the use of very high ratios between engine and axle without undue increase in diameter of gear 42 on the axle.

By referring to Figure 2 the casing 22 is shown in another position by dotted lines, so that the crankshaft axis can be placed at the rear of the rear axle if desired without affecting either the vertical disposition of said crankshaft or the operation of the device.

Figure 5:
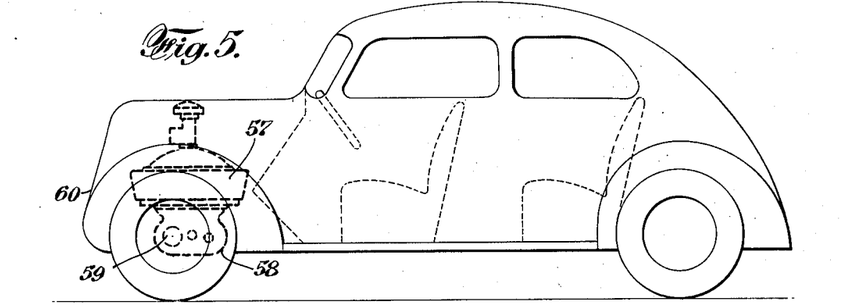
Figure 5 is a side view of a passenger vehicle similar to that of Figure 1, showing the power plant and transmission constituting my invention as applied to the front axle.

By referring to Figure 5 it will be seen that the radial engine 57 and the transmission thereunder within the casing 58 is applied to the front axle 59 of the vehicle 60. The form of transmission for such an arrangement can obviously be similar to that hereinbefore described.

Figure 6:
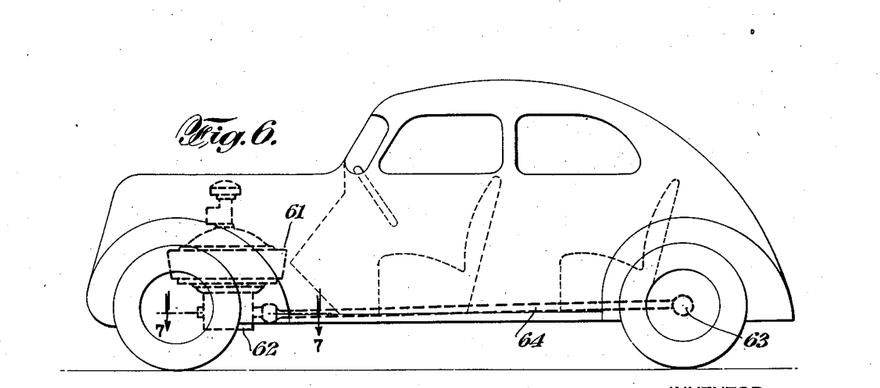
Figure 6 is a side view of a passenger vehicle similar to that of Figures 1 and 2, but showing the engine and transmission constituting my invention placed at the front of the vehicle and adapted to drive a conventional rear axle by means of a propeller shaft.
Figure 7:
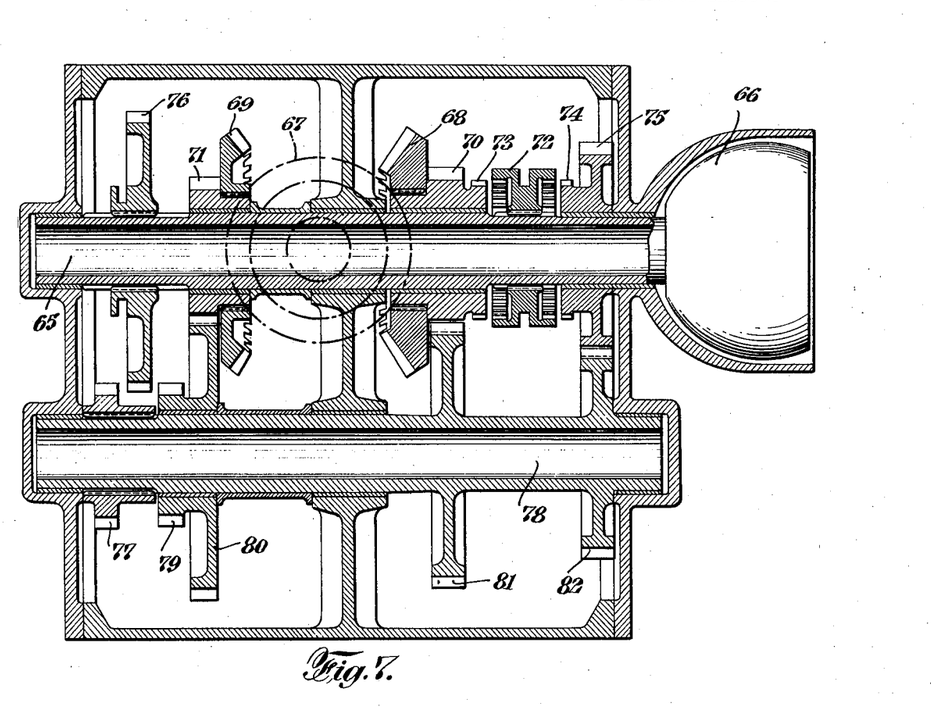
Figure 7 is an enlarged sectional plan view taken along line 7—7 of Figure 6, showing the main shaft of the transmission operatively connected to a universal joint for driving the propeller shaft substantially coaxial with said main shaft.

In Figure 6, the engine 61 and the transmission within the casing 62 is placed at the forward part of the vehicle and is adapted to drive a conventional rear axle 63 by means of a propeller shaft 64. Figure 7, which is a sectional plan taken through the transmission mechanism of Figure 6, discloses the arrangement of the elements constituting this adaptation of my invention. It will be noted that the power output shaft 65 is directly connected to the universal joint 66, this being attached to the said propeller shaft 64 extending to the rear axle. The arrangement of gears is substantially similar to that shown in Figure 4, except that the gear 41 is omitted. Inasmuch as said latter gear in Figure 4 serves to transmit the rotary motion of the power output shaft to the rear axle, the presence of such a gear in the construction of Figure 7 is unnecessary in view of the fact that the rear axle is remote from the power output shaft 65.

The crankshaft bevel gear 67 shown in dot-dash lines in Figure 7 is operatively connected to bevel gears 68 and 69 at diametrically opposite portions thereof, said gear 68 and 69 being fixed on gears 70 and 71 respectively. The gears 70 and 71 are in turn rotatably mounted upon the power output shaft 65. The coupling 72 slidably mounted on shaft 65 is engageable with the splined extension 73 on gear 70, or the splined extension 74 on gear 75. The shaft 65 also contains slidably mounted thereon the gear 76 adapted for engagement either with the first gear 77 on shaft 78, or the gear 79 affixed to gear 80 loosely mounted on said shaft 78. Rigidly connected to said shaft 78 are the two gears 81 and 82. It is obvious, as hereinabove explained, that the operation of the shafts 65 and 78, and the associated parts, is similar to that described with reference to Figure 4, and a repeated explanation thereof is deemed unnecessary. It will be seen that the output of the shaft 65 is at one end in the form of a universal-like joint 66 which may in turn be suitably connected to the driving axle.

Figure 8:
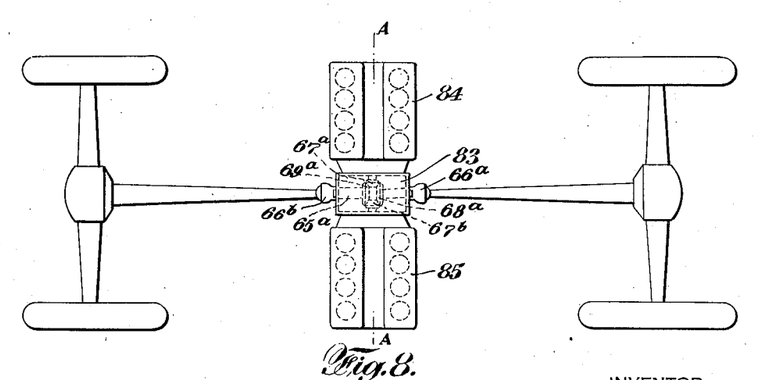
Figure 8 is a semi-diagrammatic plan view of a vehicle employing my invention operatively connected to and flanked by two engines.

In Figure 8, the transmission 83 constituting my invention is flanked on either side of two engines 84 and 85. The crankshafts of both of these engines are coaxial along the common axis AA, and contain at the inner extremities thereof crankshaft bevel gears 67a and 67b in operative engagement with bevel gears 68a and 69a rotatably mounted upon a single common output power shaft 65a in the transmission. One of the said gears 68a, 69a, being adapted for transmitting all forward speeds and the other for the reverse drive. With two universal-like couplings 66a and 66b, a drive may be affected from each of the ends of the common shaft 65 in opposite directions for the four-wheel drive as shown.

Figure 9:
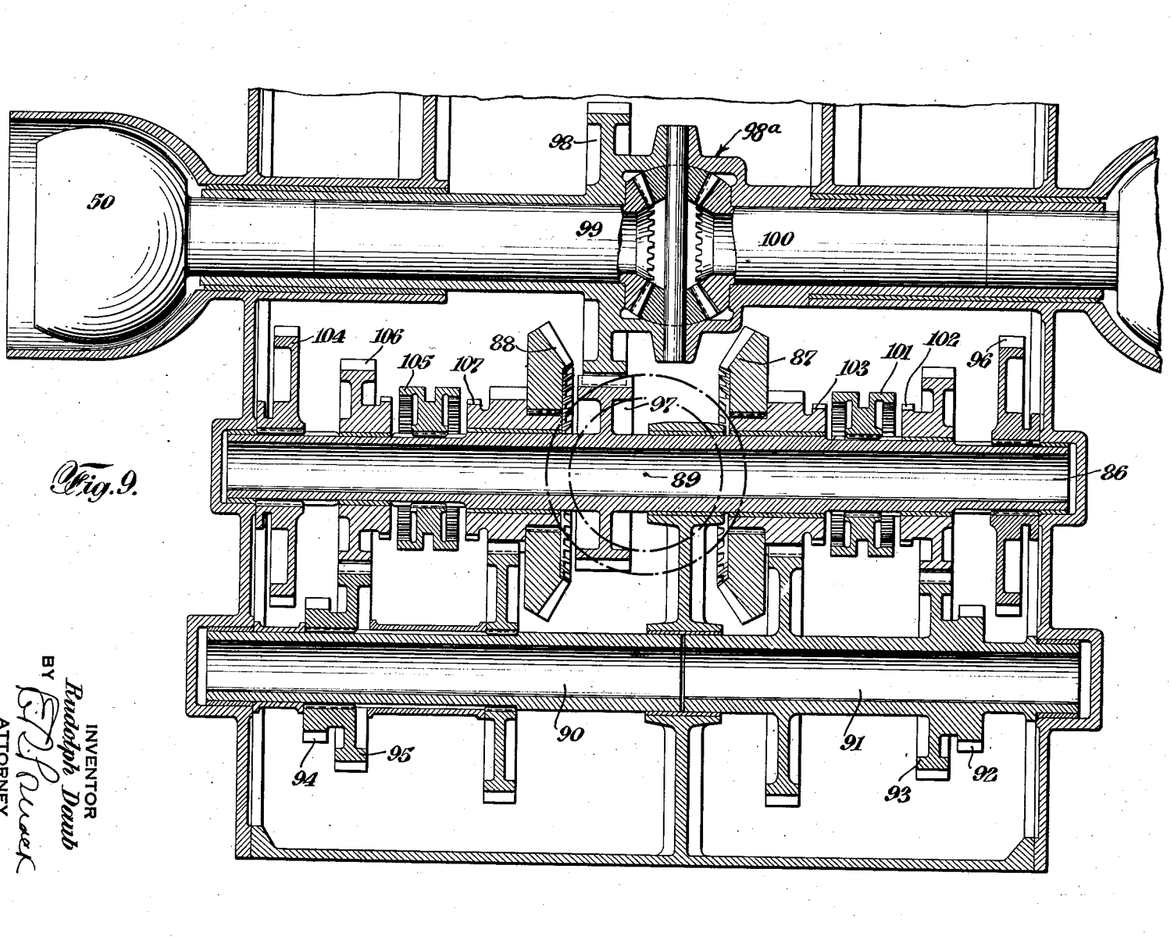
Figure 9 is an enlarged fragmentary sectional plan view of a modified adaptation of my invention as employed in a vehicle having a drive to both the front and rear axles.

Thus, by referring to Figure 9, the power output shaft 86 contains thereon the forward bevel gear 87 and the reverse bevel gear 88, these being engaged by the said crankshaft bevel gears the common axis of which extends through point 89 (see Figure 9). In this construction, there are three forward and three reverse speeds, the lay shaft containing two independent units 90 and 91 rotatable in opposite directions.

In this construction, the first forward speed gear is 92, analogous to gear 54 of Figure 4. Said gear 92 is rigidly mounted on shaft 91, and as shown, is made an integral part of gear 93. The reverse first speed is 94, rigidly mounted on shaft 90 and shown as an integral part of gear 95. For effecting forward speeds, the slidable gear 96 is moved to the left to engage gear 92, thereby causing a rotation of shaft 86 and a consequent rotation of gears 97 and 98, to produce a rotation of the axle shafts 99 and 100, differentially connected within the differential housing 98a.

To effect a second forward speed, the coupling 101 is moved to the right to engage the splines 102, thereby causing a consequent rotation of shaft 86 in the manner hereinbefore described; and to effect a third speed the said coupling is moved to the left to engage the splines 103, and also cause an operative actuation of shaft 86 and consequently the axles 99 and 100 in the manner hereinabove described. In all the forms shown only two shafts are employed in the transmission of the forward speeds or in the transmission of the reverse speed or speeds.

To effect the three reverse speeds the gear 104 and coupling 105 are operatively moved to cause an engagement with the coacting gears such as gears 106 and 94 and splines 107 all in the manner hereinbefore described.

With this last mentioned arrangement, it is thus apparent that all the advantages of my transmission as applied to the conventional vehicle may be utilized in driving such vehicles as combat cars requiring various forward and reverse speeds as well as any other vehicles where two oppositely positioned engines are deemed necessary.

It is of course understood that the various embodiments above described and shown in the drawings are illustrative of my invention and not employed by way of limitation, inasmuch as numerous changes and modifications may be made within the scope of the appended claims without departing from the spirit of this invention.

What I claim is:

1. In combination with the crankshaft of a vehicular power plant, a forward and reverse variable speed transmission mechanism containing a power input shaft coaxial with said crankshaft, a power output shaft at right angles to said input shaft, an input bevel gear on said input shaft, a forward and a reverse bevel gear rotatably mounted on said output shaft in operative engagement with said input gear at substantially diametrically opposite sides thereof, a lay shaft substantially parallel to said power output shaft, coacting geared means on said lay and power output shafts selectively cooperable with said forward and reverse bevel gears and said power output shaft, and transmission means operatively connecting said power output shaft to the axle of the vehicle.

2. In combination with the crankshaft of a vehicular power plant, a forward and reverse variable speed transmission mechanism containing a power input shaft coaxial with said crankshaft, a power output shaft angularly disposed with reference to said input shaft, an input bevel gear on said input shaft, a forward and a reverse bevel gear rotatably mounted on said output shaft in operative engagement with said input gear at substantially diametrically opposite sides thereof, a lay shaft substantially parallel to said power output shaft, coacting geared means on said lay and power output shafts selectively cooperable with said forward bevel gear and said power output shaft, means for releasably locking said forward bevel gear to said power output shaft for effecting a direct drive, coacting geared means on said lay and power output shafts cooperable with said reverse bevel gear and said power output shaft, and transmission means operatively connecting said power output shaft to the axle of the vehicle.

3. In combination with the crankshaft of a vehicular power plant, a forward and reverse variable speed transmission mechanism containing a power input shaft coaxial with said crankshaft, a power output shaft at right angles to said input shaft, an input bevel gear on said input shaft, a forward and a reverse bevel gear rotatably mounted on said output shaft in operative engagement with said input gear at substantially diametrically opposite sides thereof, a lay shaft substantially parallel to said power output shaft, coacting geared means on said lay and power output shafts selectively cooperable with said forward and reverse bevel gears and said power output shaft, and a propeller shaft coaxial with the power output shaft and operatively connecting said latter shaft to the axle of the vehicle.

4. In combination with the crankshaft of a vehicular power plant, a forward and reverse variable speed transmission mechanism containing a power input shaft coaxial with said crankshaft, a power output shaft at right angles to said input shaft, a forward and a reverse bevel gear rotatably mounted on said output shaft, geared means associated with the crankshaft for actuating said forward and reverse gears in opposite directions, coacting geared means selectively cooperable with said forward and reverse bevel gears and said power output shaft, and transmission means operatively connecting said power output shaft to the axle of the vehicle.

5. In combination with the crankshaft of a vehicular power plant and an axle remote therefrom, a forward and reverse variable speed transmission mechanism containing a power input shaft coaxial with said crankshaft, a power output shaft at right angles to said input shaft, an input bevel gear on said input shaft, a forward and a reverse bevel gear rotatably mounted on said output shaft in operative engagement with said input gear at substantially diametrically opposite sides thereof, a lay shaft substantially parallel to said power output shaft, coacting geared means on said lay and power output shafts selectively cooperable with said forward and reverse bevel gears and said power output shaft, a propeller shaft operatively connected to the wheels of the vehicle, and universal means joining said power output shaft and said propeller shaft.

6. In combination with the crankshaft of a vehicular power plant, a forward and reverse variable speed transmission mechanism containing a power input shaft coaxial with said crankshaft, a power output shaft at right angles to said input shaft, an input bevel gear on said input shaft, a forward and a reverse bevel gear rotatably mounted on said output shaft in operative engagement with said input gear at substantially diametrically opposite sides thereof, a lay shaft substantially parallel to said power output shaft, coacting geared means on said lay and power output shafts selectively cooperable with said forward and reverse bevel gears and said power output shaft, a universal joint at each terminal of the power output shaft, and transmission means connecting the wheels of the vehicle to said universal joints.

7. In combination with the crankshaft of a vehicular power plant, a forward and reverse variable speed transmission mechanism containing a power input shaft coaxial with said crankshaft, a power output shaft angularly disposed with reference to said input shaft, an input bevel gear on said input shaft, a forward and a reverse bevel gear rotatably mounted on said output shaft in operative engagement with said input gear at substantially diametrically opposite sides thereof, a lay shaft substantially parallel to said power output shaft, coacting geared means on said lay and power output shafts selectively cooperable with said forward and reverse bevel gears and said power output shaft, a spur gear pinion keyed to the power output shaft, and an axle assembly containing differential gear means and a spur gear operatively associated therewith, said spur gear being in constant engagement with said pinion.

8. In combination with the crankshaft of a vehicular power plant, a forward and reverse variable speed transmission mechanism containing a power input shaft coaxial with said crankshaft, a power output shaft at right angles to said input shaft, a forward and a reverse bevel gear rotatably mounted on said output shaft, geared means associated with the crankshaft for actuating said forward and reverse gears in opposite directions, coacting geared means selectively cooperable with said forward and reverse bevel gears and said power output shaft, a spur gear pinion keyed to the power output shaft, and an axle assembly containing differential gear means and a spur gear operatively associated therewith, said spur gear being in constant engagement with said pinion.

9. In combination with the crankshaft of a vehicular power plant, a forward and reverse variable speed transmission mechanism, an axle assembly operatively connected thereto, and a unitary housing containing both said transmission mechanism and said axle assembly, the said transmission mechanism containing a power input shaft coaxial with said crankshaft, a power output shaft at right angles to said input shaft, an input bevel gear on said input shaft, a forward and a reverse bevel gear rotatably mounted on said output shaft in operative engagement with said input gear at substantially diametrically opposite sides thereof, a lay shaft substantially parallel to said power output shaft, coacting geared means on said lay and power output shafts selectively cooperable with said forward and reverse bevel gears and said power output shaft, a spur gear pinion keyed to the power output shaft, said axle assembly containing differential gear means and a spur gear operatively associated therewith, said spur gear being in constant engagement with said pinion.

10. In combination with the crankshaft of a vehicular power plant, a forward and reverse variable speed transmission mechanism containing a power input shaft coaxial with said crankshaft, a power output shaft at right angles to said input shaft, an input bevel gear on said input shaft, a forward and a reverse bevel gear rotatably mounted on said output shaft in operative engagement with said input gear at substantially diametrically opposite sides thereof, a lay shaft substantially parallel to said power output shaft, coacting geared means on said lay and power output shafts selectively cooperable with said forward and reverse bevel gears and said power output shaft, a spur gear pinion keyed to the power output shaft, a differential cage, two coaxial shafts differentially connected within the cage, a spur gear affixed to the cage and in geared engagement with said pinion on the power output shaft, a universal joint at the opposite terminal ends of each of said coaxial shafts, and transmission means connecting the wheels of the vehicle to said universal joints.

11. In combination with a vehicular power plant, a forward and reverse variable speed transmission mechanism, and a unitary housing containing both said transmission mechanism and the power plant, the said transmission mechanism containing a power input shaft coaxial with the crankshaft of the power plant, a power output shaft at right angles to said input shaft, an input bevel gear on said input shaft, a forward and a reverse bevel gear rotatably mounted on said output shaft in operative engagement with said input gear at substantially diametrically opposite sides thereof, a lay shaft substantially parallel to said power output shaft, coacting geared means on said lay and power output shafts selectively cooperable with said forward bevel gear and said power output shaft, means for releasably locking said forward bevel gear to said power output shaft for effecting a direct drive, coacting geared means on said lay and power output shafts cooperable with said reverse bevel gear and said power output shaft, and transmission means operatively connecting said power output shaft to the axle of the vehicle.

12. In combination with the crankshaft of a vehicular power plant, a forward and reverse variable speed transmission mechanism containing a power input shaft coaxial with said crankshaft, a power output shaft at right angles to said input shaft, an input bevel gear on said input shaft, a forward and a reverse bevel gear rotatably mounted on said output shaft in operative engagement with said input gear at substantially diametrically opposite sides thereof, a lay shaft substantially parallel to said power output shaft, coacting geared means on said lay and power output shafts selectively cooperable with said forward and reverse bevel gears and said power output shaft, a spur gear pinion keyed to the power output shaft, and an axle assembly containing a differential, two substantially coaxial shafts connecting the differential with the driving wheels of the vehicle, a rotatable housing for the differential associated with the axle, and a spur gear affixed to said housing and in geared engagement with the said pinion on the power shaft.

RUDOLPH DAUB.